US010521920B2

(12) United States Patent
Grunnet-Jepsen

(10) Patent No.: US 10,521,920 B2
(45) Date of Patent: Dec. 31, 2019

(54) REDUCING TEXTURED IR PATTERNS IN STEREOSCOPIC DEPTH SENSOR IMAGING

(71) Applicant: Intel Corporation, Santa Clara, CA (US)

(72) Inventor: Anders Grunnet-Jepsen, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 57 days.

(21) Appl. No.: 15/711,250

(22) Filed: Sep. 21, 2017

(65) Prior Publication Data
US 2019/0087968 A1 Mar. 21, 2019

(51) Int. Cl.
G06T 7/521 (2017.01)
G06T 7/593 (2017.01)
H04N 13/128 (2018.01)
H04N 13/25 (2018.01)
H04N 13/243 (2018.01)
H04N 5/33 (2006.01)
H04N 13/254 (2018.01)
H04N 13/257 (2018.01)
H04N 13/271 (2018.01)
H04N 13/239 (2018.01)
H04N 5/225 (2006.01)

(52) U.S. Cl.
CPC .............. *G06T 7/521* (2017.01); *G06T 7/593* (2017.01); *H04N 5/332* (2013.01); *H04N 13/128* (2018.05); *H04N 13/239* (2018.05); *H04N 13/243* (2018.05); *H04N 13/25* (2018.05); *H04N 13/254* (2018.05); *H04N 13/257* (2018.05); *H04N 13/271* (2018.05); *H04N 5/2256* (2013.01)

(58) Field of Classification Search
CPC ....... G06T 7/521; G06T 7/593; H04N 13/128; H04N 13/243; H04N 13/25; H04N 5/2256; H04N 5/332
See application file for complete search history.

(56) References Cited

U.S. PATENT DOCUMENTS

2014/0240492 A1* 8/2014 Lee ..................... H04N 5/2256 348/136
2016/0309134 A1* 10/2016 Venkataraman ..... H04N 13/243

* cited by examiner

*Primary Examiner* — Christopher S Kelley
*Assistant Examiner* — Nasim N Nirjhar
(74) *Attorney, Agent, or Firm* — Green, Howard & Mughal LLP

(57) ABSTRACT

Systems, devices, and techniques related to removing infrared texture patterns used for depth sensors are discussed. Such techniques may include applying a color correction transform to raw input image data including a residual infrared texture pattern to generate output image data such that the output image data has a reduced IR texture pattern residual with respect to the raw input image data.

17 Claims, 9 Drawing Sheets

REDUCING TEXTURED IR PATTERNS IN STEREOSCOPIC DEPTH SENSOR IMAGING

BACKGROUND

In computer vision and other imaging and computing contexts, depth images may be generated based on two (e.g., left and right or reference and target) two-dimensional images of a scene. In particular, in assisted stereoscopic or active stereoscopic techniques, an infrared (IR) textured pattern is projected onto a scene such that the images obtained during exposure include the IR textured pattern as modified by the scene. Such techniques may be advantageous when the scene itself does not include a lot of texture (e.g., for blank white walls or similar scene elements). The obtained images including the IR texture are then used to generate a depth image using stereoscopic image matching techniques or the like. Such depth image(s) may be used in a wide variety of contexts.

Furthermore, it may be desirable to obtain a color image of the scene that does not include the IR textured pattern for display to a user, for use in computer vision, or for other purposes. Current techniques for obtaining a color image of the scene excluding the IR textured pattern in addition to the image including the IR textured pattern are costly, power intensive, reduce available frame rates, and/or tend to undesirably increase the size of the imaging devices. For example, separate imagers may be used to obtain a color image without the IR texture in addition to the image with the IR texture, which may add cost, power usage, and device size. In another example, time multiplexing techniques may be used such that an IR projector is turned on/off and separate images with IR texture (IR projector on) and without IR texture (IR projector off) images are obtained. However, such techniques limit frame rate and such implementations are susceptible to problems caused by motion in the scene. Finally, image sensors are available that include a modified Bayer pattern of R, G, B, IR sub-pixels that may be used to extract RGB image data from IR image data. Alternatively, image sensors currently under development include an organic layer on the image sensor that may be activated electronically to selectively add IR or RGB sensitivity. However, such image sensors are undesirably large and expensive.

Therefore, current techniques do not provide for high quality images including and excluding the IR textured pattern that are cost effective, limit power usage and device size, and offer ease of implementation. It is with respect to these and other considerations that the present improvements have been needed. Such improvements may become critical as the desire to utilize depth images in a variety of applications becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
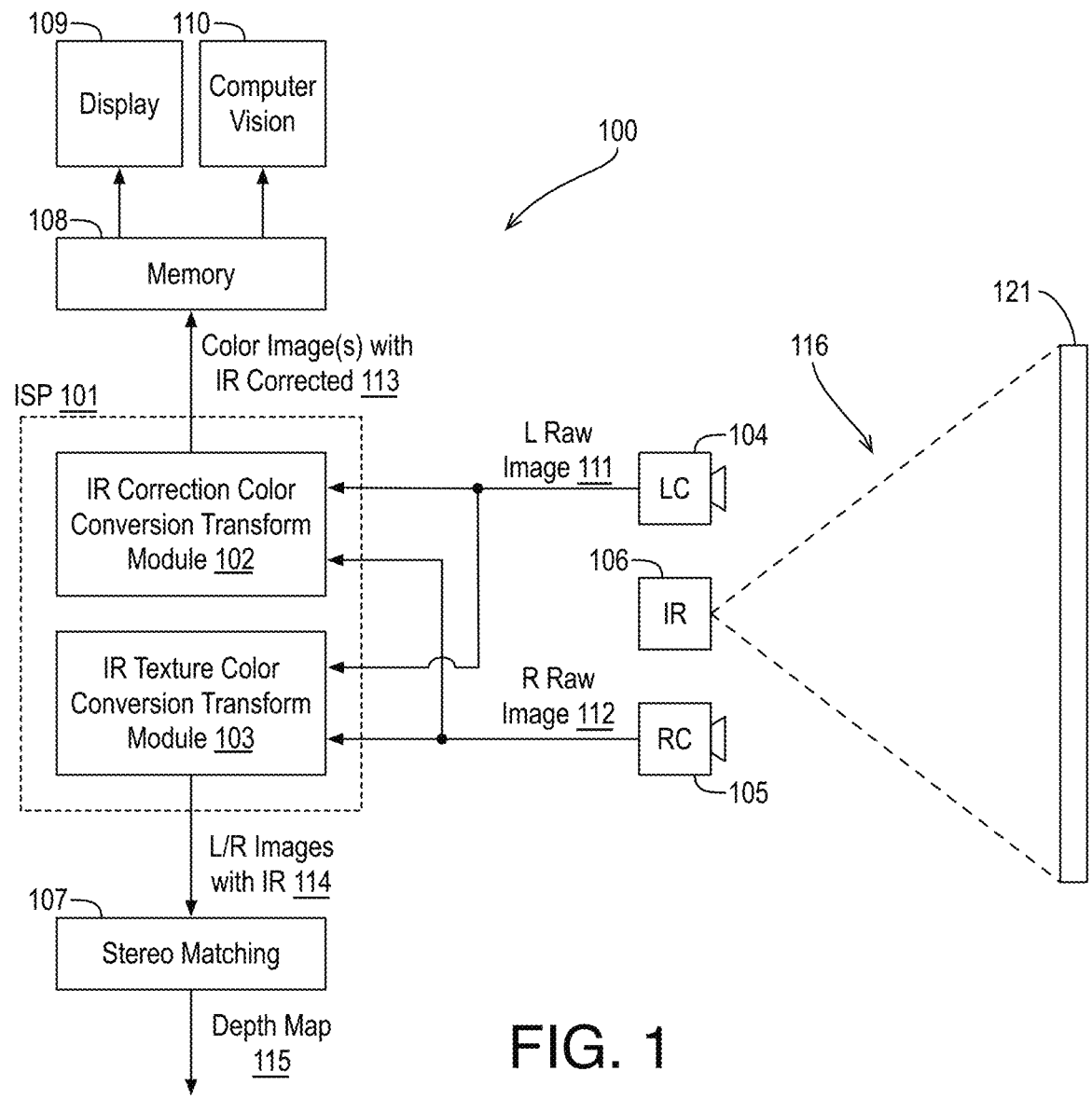
FIG. 1 illustrates components of an example system for processing images to correct for an IR texture pattern residual and to generate depth maps.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or such embodiments, or examples, etc., indicate that the implementation, embodiment, or example described may include a particular feature, structure, or characteristic, but every implementation, embodiment, or example may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to affect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to image processing in depth sensors to remove infrared (IR) texture pattern residuals from images or image data.

As described above, in some contexts, depth images may be generated using two (e.g., left and right or reference and target) two-dimensional color images of a scene such that an infrared (IR) textured pattern has been projected onto the scene during image capture. Such an IR textured pattern provides IR texture pattern residuals in the captured image, which may improve stereoscopic image matching, particularly when the scene would not otherwise contain texture details for the matching. In some embodiments discussed herein, the IR texture pattern residual may be removed from the image or image data by applying a color correction transform to raw input image data including the IR texture pattern residual or image data corresponding to the raw input image data including the IR texture pattern residual to generate output image data such that the color correction transform corrects for the IR texture pattern residual and the output image data has a reduced IR texture pattern residual with respect to the raw input image data and/or the image data corresponding to the raw input image data.

The color correction transform may include any suitable color correction transform to correct for the IR texture pattern residual and the color correction transform may be applied using any suitable technique or techniques. In some embodiments, the color correction transform is applied to raw image data from an image sensor having a color filter array (CFA) thereon such that the color correction transform translates from sub-pixel signals corresponding to colors of the CFA to pixel values of an output image (e.g., each pixel value including a red value, a green value, and a blue value). In other embodiments, the color correction transform is applied to image data corresponding to the raw input image data such that the raw input image data has been modified in some way such as smoothing, bias adjustments, or the like prior to the application of the color correction transform.

Such techniques provide for output images of a scene with little or no IR texture pattern residual as well as depth maps or depth images corresponding to the scene. Such output images may be presented to a user (e.g., without the unsightly IR texture pattern residual), used in computer vision analysis or applications (e.g., without the IR texture pattern residual which may cause analysis failures) such as edge detection, object detection, object tracking, gesture recognition and device control based on such gestures, facial pose recognition and device control based on such facial gestures, three-dimensional scene reconstruction, scene understanding, virtual reality, augmented reality, etc. Such depth maps or depth images may also be used in such computer vision analysis or applications. Such techniques may offer the advantage of providing left and right color images without texture that are perfectly registered and maintain calibration with respect to the left and right color images with texture. For example, systems that have external color imagers have calibration difficulties such that every color pixel is not matched with resultant depth pixels. Such matching of color image pixels (e.g., R, G, B pixels of color images without texture) and depth pixels (e.g., D pixels of resultant depth images) may be critical in a variety of use cases such as background segmentation (e.g., green screening), object detection, object extraction, and the like.

FIG. 1 illustrates components of an example system 100 for processing images to correct for an IR texture pattern residual and to generate depth maps, arranged in accordance with at least some implementations of the present disclosure. As shown in FIG. 1, system 100 may include an image signal processor (ISP) 101 to implement an IR correction color conversion transform module 102 and an IR texture color conversion transform module 103, a left camera 104, a right camera 105, an IR transmitter 106, a stereo matching module 107, a memory 108, a display 109, and a computer vision module 110. Also as shown, IR transmitter 106 projects an IR texture pattern 116 onto a scene 121 such that an IR texture pattern residual is obtained when an image or image data are captured corresponding to scene 121 by left camera 104 and right camera 105. For example, infrared transmitter 106 illuminates scene 121 with infrared light and left camera 104 and right camera 105 attain left (L) raw image 111 and right (R) raw image 112 based on scene 121 and the illumination of IR texture pattern 116 provided via IR transmitter 116. IR transmitter 106 may be any suitable IR transmitter such as an IR laser or the like and IR texture pattern 116 may include any suitable pattern such as a grid pattern, or the like.

Left camera 104 and right camera 105 may include any suitable color camera or color camera modules each including, for example, an image sensor and a color filter array covering the image sensor such that the image sensor detects and conveys the data or information of an image by converting light (as they pass through the color filter array) into signals or signal values. As is discussed further herein, the color filter array has elements that allow a particular color (i.e., red, green, or blue) of light to pass through the element. However, such color filter array elements are imperfect and allow other colors as well as IR light to pass such that all light allowed to pass is detected by sub-pixels of the image sensors. As such, raw image data (e.g., left raw image 111 and right raw image 112) from left camera 104 and right camera 105 (or the image sensors thereof) includes a residual of the discussed IR texture pattern 116.

As discussed further herein, system 100 may correct, via a color correction transform to remove IR, for the residual of IR texture pattern 116 in one or both of left raw image 111 and right raw image 112 to generate one or more color images with IR correction 113. Furthermore, system 100 may generate, via another color correction transform to retain IR texture, left and right images with IR texture 114. As shown, color image(s) with IR correction 113 may be stored to memory 108 for eventual display to a user via display 109, for use in computer vision via computer vision module 110, or for other uses where it is desirable to have an image with the IR texture corrected or removed. Furthermore, left and right images with IR texture 114 may be provided for use by stereo matching module 107 to generate a depth map 115 via stereo matching techniques.

System 100 or any combination of components thereof may be implemented via any suitable device such as a depth sensor, a depth sensor module, or the like. Although discussed herein with respect to implementation via a depth sensor module, system 100 may be implemented in any other suitable imaging device such as a personal computer, a laptop computer, a tablet, a phablet, a smart phone, a digital camera, a gaming console, a wearable device, a set top device, or the like.

Figure 2:
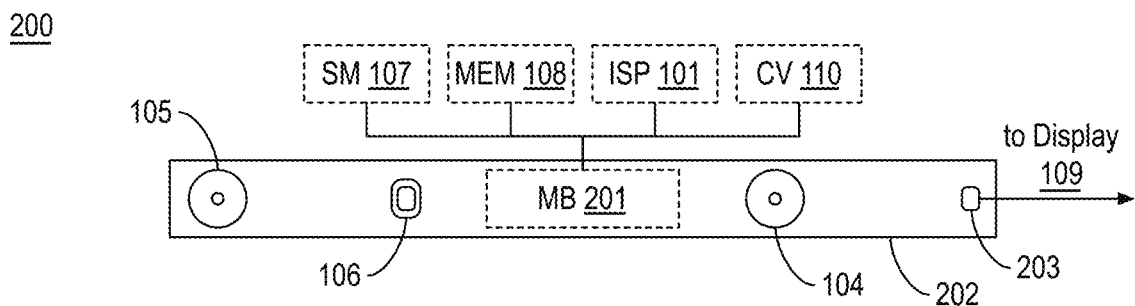
FIG. 2 illustrates an example device for processing images to correct for an IR texture pattern residual and to generate depth maps.

FIG. 2 illustrates an example device 200 for processing images to correct for an IR texture pattern residual and to generate depth maps, arranged in accordance with at least some implementations of the present disclosure. As shown in FIG. 2, device 200 may include left camera 104, right camera 105, IR transmitter 106, and a motherboard 201 to implement, within a housing 202 of device 200, stereo matching module 107, memory 108, ISP 101, and computer vision module 110. Also as shown, device 200 may include a display port 203 to transmit image data for presentment to a user via display 109, which may be implemented as an integrated component of device 200 or separately from device 200.

With reference to FIGS. 1 and 2, in some embodiments, stereo matching module 107 is implemented via hardware (e.g., a graphics processor or ISP 101) to generate depth map 115 or a depth image based on left and right images with IR texture 114. For example, left and right images with IR texture 114 may include red-green-blue (RGB) image data such that each pixel location of left and right images with IR texture 114 includes a red value, a green value, and a blue value. Although discussed with respect to RGB image data, left and right images with IR texture 114 and/or color images with IR correction 113 may be in any suitable color space such as YUV, YCbCR, or the like. For example, stereo matching module 107 may generate a depth image or a depth map such as depth map 115 based on a search of a target image (i.e., right image) based on a window generated around a pixel location in a reference (i.e., left image) image. As shown, left camera 104 and right camera 105 may be horizontally aligned or substantially horizontally aligned with respect to scene 121 to attain images (i.e., left and right images with IR texture 114) to perform stereoscopic image matching for scene 121 as is discussed further herein.

Figure 3:
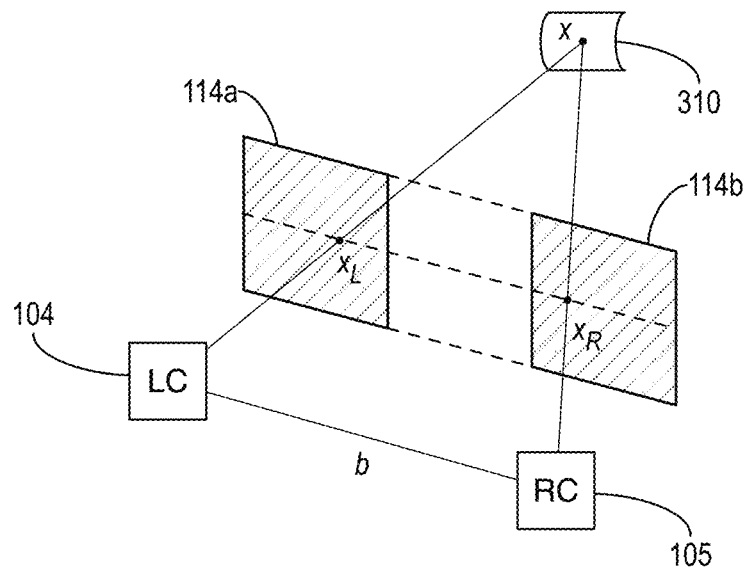
FIG. 3 illustrates an example stereoscopic image matching.

FIG. 3 illustrates an example stereoscopic image matching 300, arranged in accordance with at least some implementations of the present disclosure. As shown in FIG. 3, stereoscopic image matching 300 may include attaining left and right images with IR texture 114a and 114b, respectively, of scene 121, which may include an example surface 310. As discussed, left and right images with IR texture 114 may include a left or reference image 114a and a right or target image 114b attained via a left camera 104 and a right camera 105 and image processing discussed further herein, respectively. As illustrated, in some examples, the left image may be the reference image and the right image may be the target image. In other examples, the right image may be the reference image and the left image may be the target image and/or additional target images may be used. Furthermore, scene 121 may include any suitable scene including indoor or outdoor scenes, scenes including objects and/or people, and so on.

Stereo matching techniques may determine a depth image based on triangulating correspondences. For example, as shown in FIG. 3, given left and right images with IR texture 114, each including a representation of three-dimensional point x on surface 310, the depth, d, of x, may be determined based on d=f*b/disp, where f and b are the focal length and base line, respectively, and disp, is the disparity for x, indicating the pixel displacement of x between left and right images with IR texture 114 (e.g., $x_L-x_R$, where $x_L$, and $x_R$ are the projections of x onto left and right images with IR texture 114, respectively). To determine the disparity, a rectangular template or window may be formed around $x_L$, on the left or reference image (e.g., left image with IR texture 114a) and search windows in the right or target image (e.g., right image with IR texture 114b) may be searched horizontally for the best match. Such a process may be repeated for all or some pixels of left and right images with IR texture 114 to generate disparity values for the associated pixel locations. Such disparity values may be translated to depth values (e.g., such that d=f*b/disp) and the resultant depth image or map (e.g., depth map 115) may include depth values for such pixels. As discussed, the inclusion of the residual of IR texture pattern 116 within left and right images with IR texture 114 may aid in the discussed stereoscopic image matching.

Referring again to FIG. 1, during the illumination of IR texture pattern 116 onto scene 121 by IR transmitter 106, left camera 104 and right camera 105 attain left raw image 111 and right raw image 112. As discussed, it is advantageous to include an IR texture pattern residual in the images for stereoscopic image matching to increase the accuracy of the matching particularly in low detail or low texture scenes. As shown in FIG. 1, left raw image 111 and right raw image 112 are provided to IR texture color conversion transform module 103. IR texture color conversion transform module 103 receives left raw image 111 and right raw image 112 and IR texture color conversion transform module 103 generates left and right images with IR texture 114. IR texture color conversion transform module 103 may generate left and right images with IR texture 114 using any suitable technique or techniques. In some embodiments, IR texture color conversion transform module 103 applies a color correction transform or matrix to left raw image 111 and right raw image 112 (e.g., image data from an image sensor) or to image data corresponding to left raw image 111 and right raw image 112 to generate left and right images with IR texture 114 such that left and right images with IR texture 114 retain residual IR texture.

Furthermore, it may be advantageous to provide one or more color images with IR correction 113 for presentment to a user, for use in computer vision, or for other uses such that color image(s) with IR correction 113 have corrected, reduced, or eliminated IR residual texture. As shown, left raw image 111 and/or right raw image 112 are provided to IR correction color conversion transform module 102. IR correction color conversion transform module 102 receives one or both of left raw image 111 and right raw image 112 and IR correction color conversion transform module 102 generates one or more color images with IR correction 113. In an embodiment, only one of left raw image 111 or right raw image 112 are used to generate a single color image with IR correction 113. In an embodiment, both left raw image 111 or right raw image 112 are used to generate two color images with IR correction 113. IR correction color conversion transform module 102 may generate color image(s) with IR correction 113 using any suitable technique or techniques. In some embodiments, IR correction color conversion transform module 102 applies a color correction transform or matrix to left raw image 111 and/or right raw image 112 (e.g., image data from an image sensor) or to image data corresponding to left raw image 111 and right raw image 112 (e.g., raw image data that has been preprocessed) to generate color image(s) with IR correction 113.

For example, left raw image 111 and right raw image 112 may include any suitable raw images or raw image data or the like. In an embodiment, each of left camera 104 and right camera 105 include an image sensor (e.g., a complementary metal-oxide-semiconductor (CMOS) sensor) having a red-green-blue color filter array thereon and/or image pre-processing modules or components to provide left raw image 111 and right raw image 112.

Figure 4:
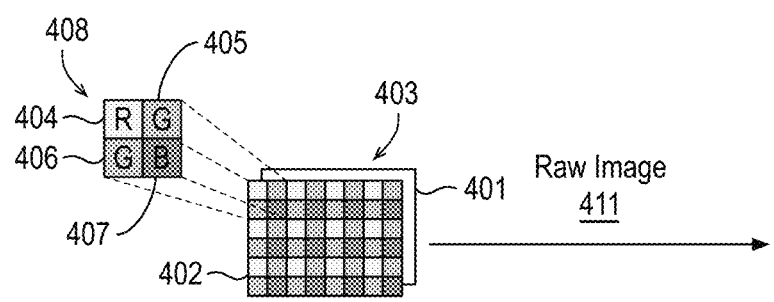
FIG. 4 illustrates an example image sensor and an example color filter array.

FIG. 4 illustrates an example image sensor 401 and an example color filter array 402, arranged in accordance with at least some implementations of the present disclosure. As shown in FIG. 4, color filter array 402 may include an array of color filter elements 403 such that each color filter element of color filter elements 403 such as color filter elements 404, 405, 406, 407 (with each color filter element being red (R), green (G), or blue (B) in the illustrated embodiment) of color filter array 402 attempts to block all other colors of light (e.g., R color filter element 404 attempts to block all but red light, G color filter elements 405, 406 attempt to block all but green light, and B color filter element 407 attempts to block all but blue light). Furthermore, each of color filter elements 403 corresponds to an individual sub-pixel (not shown) of image sensor 401. Image sensor 401, during image capture, generates a signal for each sub-pixel thereof, which may be provided as raw image 411. For example, raw image 411 may include a sub-pixel signal for each sub-pixel of image sensor 401 such that, as discussed, each sub-pixel signal corresponds to an R, G, or B color filter element of color filter elements 403.

Although each of color filter elements 403 attempts to block all other light except for the band of light corresponding thereto, color filter elements 403 invariably leak other colors of light into the corresponding sub-pixel of image sensor 401. For example, blue sub-pixels (i.e., sub-pixels having a B color filter array element such as color filter element 407) respond to green and red light as well as IR (i.e., about 850 nm) light. Similarly, red sub-pixels (i.e., sub-pixels having a R color filter array element such as color filter element 404) respond to green, blue, and IR light and green sub-pixels (i.e., sub-pixels having a G color filter array element such as color filter elements 405, 406) respond to red, blue, and IR light.

Furthermore, groupings of color filter elements and corresponding sub-pixels of image sensor 401 as illustrated with respect to grouping 408 of color filter elements 404, 405, 406, 407 and the corresponding sub-pixels of image sensor 401 (not shown) may be used to generate a single pixel value of an output image as is discussed further herein below. For example, the signals or signal values corresponding to the sub-pixels of grouping 408 (i.e., a red signal value, Rs, of the sub-pixel corresponding to color filter element 404, a green signal value, Gs1, of the sub-pixel corresponding to color filter element 405, a green signal value, Gs2, of the sub-pixel corresponding to color filter element 406, and a blue signal value, Bs, of the sub-pixel corresponding to color filter element 407) may be used to determine a single pixel value (having a red value, R, a green value, G, and a blue value, B) for a pixel position of an output image based on a color conversion transform or matrix as discussed below.

Color filter array 402 may include any suitable color filter array pattern such as a Bayer color filter array pattern, a Yamanaka color filter array pattern, a Lukac color filter array pattern, a striped color filter array pattern, or a diagonal striped color filter array pattern. Furthermore, image sensor 401 may be any suitable image sensor such as a CMOS sensor. Image sensor 401 and color filter array 402 may be implemented as a part of one or both of left camera 104 and right camera 105.

Returning to FIG. 1, ISP 101 is coupled to the image sensors of left camera 104 and right camera 105 and ISP 101 receives left raw image 111 and right raw image 112 having characteristics as discussed with respect to raw image 411. ISP 101 may be any suitable image signal processor such as an application specific integrated circuits (ASIC), a programmable logic devices (PLD), or a digital signal processor (DSP). IR correction color conversion transform module 102 applies a color correction transform or matrix directly to left raw image 111 and/or right raw image 112 or to corresponding image data (e.g., after some preprocessing) to correct for the IR texture pattern residual provided by IR texture pattern 116 to remove or substantially remove the IR texture pattern residual to generate or more color images with IR correction 113 such that one or more color images with IR correction 113.

The color correction transform to provide IR correction (removal or reduction) may be any suitable color correction transform that translates from sub-pixel signals of a raw input image to pixel values of an output image. For example, the raw input image may include sub-pixel signals corresponding to R sub-pixels, G sub-pixels, and B sub-pixels as discussed with respect to FIG. 4. The color correction transform to provide IR correction may be applied to multiple sub-pixel signals of the raw input image or raw input image data to generate an individual pixel of an output image having IR correction. Such processing is repeated for any number of individual pixels of the output image. In an embodiment, the color correction transform provides a convolution of the raw input image or raw input image data to generate the output image having IR correction. In an embodiment, the color correction transform may be applied to sub-pixel regions of the raw input image or raw input image data as shown in Equation (1):

$$\begin{bmatrix} R_C \\ G_C \\ B_C \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{bmatrix} Rs \\ Gs1 \\ Gs2 \\ Bs \end{bmatrix} \quad (1)$$

where $a_{11}$-$a_{34}$ are color correction transform or matrix coefficients, R, Gs1, Gs2, and Bs are sub-pixel signal values for a particular raw image region (i.e., sub-pixel signal values for grouping 408), and $R_C$, $G_C$, and $B_C$ are pixel values for an individual pixel of an output image or of output image data having IR correction (C). For example, a color image of one or more color images with IR correction 113 may include an $R_C$, $G_C$, and $B_C$ value for each pixel location thereof as determined using Equation (1). The color correction transform or matrix may include or implement any suitable color correction transform or matrix coefficients that provide IR correction implemented using any suitable technique or techniques. In an embodiment, the color correction transform or matrix coefficients are implemented via a look up table (LUT) accessible to IR correction color conversion transform module 102.

Similarly, in some embodiments, IR texture color conversion transform module 103 applies a color correction transform or matrix directly to left raw image 111 and right raw image 112 such that IR texture color conversion transform module 103 applies a color correction transform to left raw image 111 and/or right raw image 112 to retain the IR texture pattern residual provided by IR texture pattern 116 for use in stereoscopic matching. The color correction transform to retain IR correction may be any suitable color correction transform that translates from sub-pixel signals of a raw input image to pixel values of an output image as discussed above. For example, the color correction transform to retain IR correction may be applied to multiple sub-pixel signals of the raw input image or raw input image data to generate an individual pixel of an output image having IR correction as discussed. In an embodiment, the color correction transform provides a convolution of the raw input image or raw input image data to generate the output image having IR correction. In an embodiment, the color correction transform may be applied to sub-pixel regions of the raw input image or raw input image data as shown in Equation (2):

$$\begin{bmatrix} R_{IR} \\ G_{IR} \\ B_{IR} \end{bmatrix} = \begin{bmatrix} b_{11} & b_{12} & b_{13} & b_{14} \\ b_{21} & b_{22} & b_{23} & b_{24} \\ b_{31} & b_{32} & b_{33} & b_{34} \end{bmatrix} \begin{bmatrix} Rs \\ Gs1 \\ Gs2 \\ Bs \end{bmatrix} \quad (2)$$

where $b_{11}$-$b_{34}$ are color correction transform or matrix coefficients, R, Gs1, Gs2, and Bs are sub-pixel signal values for a particular raw image region (i.e., sub-pixel signal values for grouping 408), and $R_{IR}$, $G_{IR}$, and $B_{IR}$ are pixel values for an individual pixel of an output image or of output image data having IR texture (IR). For example, color images of left and right images with IR texture 114 may include an $R_{IR}$, $G_{IR}$, and $B_{IR}$ value for each pixel location thereof as determined using Equation (2). The color correction transform or matrix may include or implement any suitable color correction transform or matrix coefficients that provide IR correction implemented using any suitable technique or techniques. In an embodiment, the color correction transform or matrix coefficients are implemented via a look up table (LUT) accessible to IR texture color conversion transform module 103.

In some embodiments, the resultant IR corrected output image(s) may be provided as one or more color images with IR correction 113 and the resultant IR texture output image(s) may be provided as left and right images with IR texture 114. In other embodiments, one or both of color image(s) with IR correction 113 and/or left and right images with IR texture 114 may be further processed along separate imaging pipelines as is discussed further herein with respect to FIG. 7.

As discussed, in some embodiments, IR correction color conversion transform module 102 and/or IR texture color conversion transform module 103 apply a color correction transform or matrix directly to left raw image 111 and/or right raw image 112. In other embodiments, IR correction color conversion transform module 102 and/or IR texture color conversion transform module 103 apply a color correction transform or matrix to image data corresponding to left raw image 111 and/or right raw image 112 such that the corresponding image data has been preprocessed to provide smoothing, remove outlier signals, etc. Such preprocessing may be performed by an image preprocessor within left and right cameras 104, 105 or by an image preprocessor or ISP 101.

Figure 5:
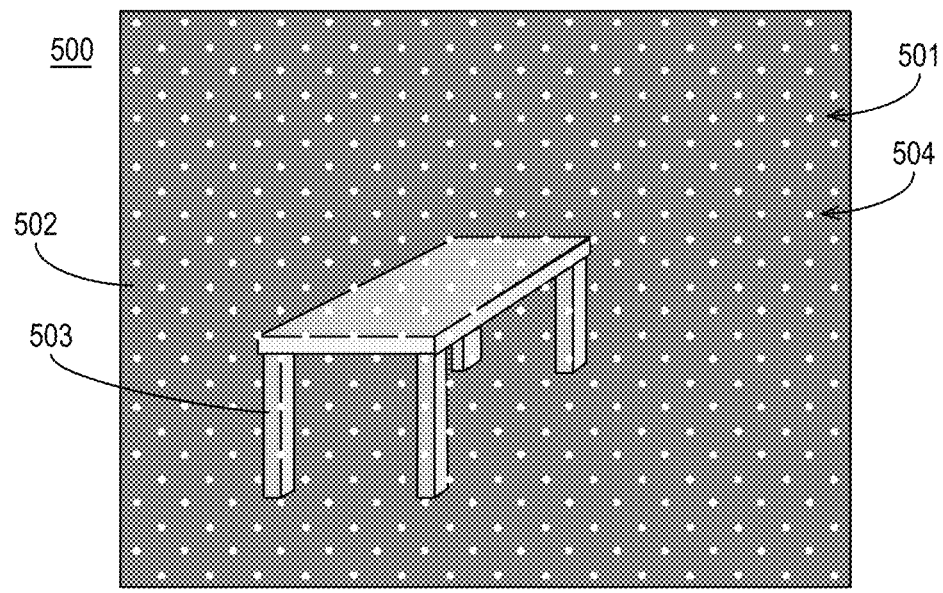
FIG. 5 illustrates a depiction of an example image with IR texture.

FIG. 5 illustrates a depiction of an example image with IR texture 500, arranged in accordance with at least some implementations of the present disclosure. For example, image with IR texture 500 may be or may be a presentment of any IR texture output image data (e.g., output image data having retained IR texture) discussed herein such as left and right images with IR texture 114 generated based on IR texture color conversion transform module 103 applying a color correction transform or matrix on left raw image 111 and right raw image 112 to retain IR texture. As shown in FIG. 5, image with IR texture 500 includes an IR texture pattern residual 501 (i.e., white dots in the illustration) from IR texture pattern 116 being projected on scene 121. As shown, in an embodiment, IR texture pattern residual 501 may have a grid like pattern of IR dots or specks or the like. However, IR texture pattern residual 501 may have any suitable pattern shape such as a random speckle pattern, a concentric ring pattern, or the like of any suitable IR projected shapes such as squares, rectangles, diamonds, or the like. Scene 121 may include any suitable scene. In the illustrated embodiment, scene 121 includes a foreground object 503 (e.g., a table) and a background 502.

As discussed, in some scenes, particularly those without native texture, IR texture pattern residual 501 may improve stereoscopic matching with another image with an IR texture residual from a matching IR texture pattern 116 being projected onto the scene. Furthermore, as shown with respect to pixel position 504, IR texture pattern residual 501 may be provided at a plurality of pixel positions within image with IR texture 500 such that the pixel positions of IR texture pattern residual 501 tend to have a greater luminance with respect to other pixel positions of image with IR texture 500. Although this will not be true of every non-IR texture pattern residual pixel position (i.e., some non-IR texture pattern residual pixel positions may also have high luminance within a scene), such greater luminance at pixel positions of IR texture pattern residual 501 will tend to occur due to the projection of IR texture pattern 116 and the sensing of the pattern by, for example, image sensor 401.

Figure 6:
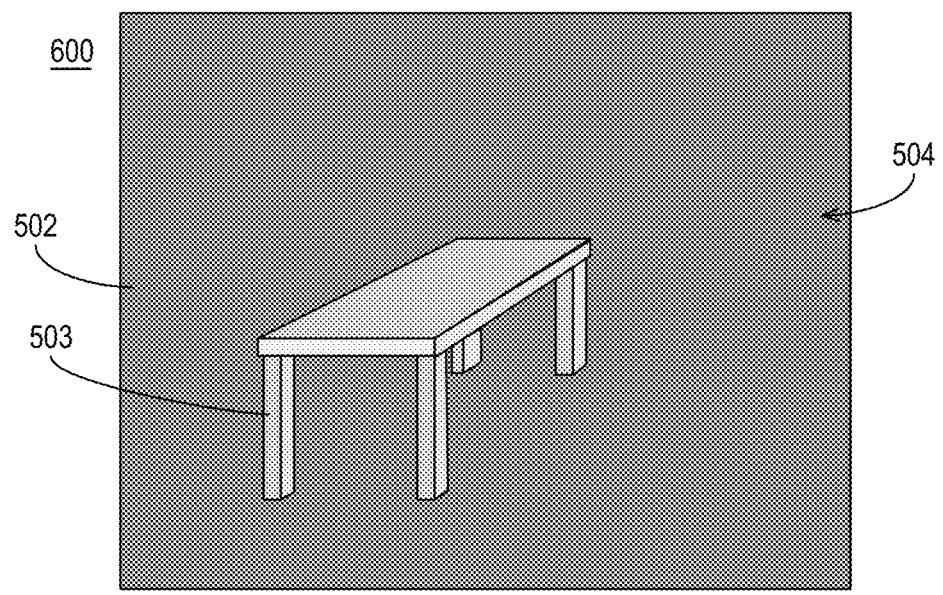
FIG. 6 illustrates a depiction of an example image corrected for IR texture.

FIG. 6 illustrates a depiction of an example image corrected for IR texture 600, arranged in accordance with at least some implementations of the present disclosure. For example, image corrected for IR texture 600 may be or may be a presentment of any output image or output image data corrected for an IR residual texture pattern by application of a color correction transform or matrix as discussed herein. For example, image corrected for IR texture 600 may be one of one or more color images with IR correction 113 generated based on IR correction color conversion transform module 102 applying a color correction transform or matrix on left raw image 111 or right raw image 112 to correct for or remove IR texture. As shown in FIG. 6, image corrected for IR texture 600 includes foreground object 503 and background 502 presented without IR texture pattern residual 501. As discussed, such a presentment may be advantageous for presentment to a user, for use in computer vision, image analysis, and other applications.

Furthermore, as shown with respect to pixel position 504, which is the same pixel position as pixel position 504, the high luminance of pixel position 504 within image with IR texture 500 is removed at pixel position 504 of image corrected for IR texture 600. For example, with reference to FIGS. 5 and 6, as is clear from a visual evaluation of image with IR texture 500 and image corrected for IR texture 600, image corrected for IR texture 600 has a reduced IR texture pattern residual with respect to image with IR texture 500 (and the corresponding raw input image data used to generate image with IR texture 500). For example, the conclusion that image corrected for IR texture 600 has a reduced IR texture pattern residual with respect to image with IR texture 500 may determined using any suitable image evaluation techniques such as a visual evaluation, a pixel comparison at pixel positions of IR texture pattern residual 501 such as pixel position 504, or the like. In an embodiment, image with IR texture 500 includes IR texture pattern residual 501 at a plurality of pixel positions within image with IR texture 500 including pixel position 504. IR texture pattern residual 501 may be at any number of pixel positions within image with IR texture 500 such as hundreds, thousands, tens of thousands, or more pixel positions. In an embodiment, each IR texture element (e.g., dot) may be used to define a corresponding pixel position of image with IR texture 500. In other embodiments, each IR texture element (e.g., dot) may be used to define a plurality of corresponding pixel position of image with IR texture 500. Furthermore, in the following discussion each and every IR texture element may be used or only a subset thereof may be used.

In an embodiment, image corrected for IR texture 600 having a reduced IR texture pattern residual with respect to image with IR texture 500 includes image with IR texture 500 having an average luminance at the plurality of pixel positions within image with IR texture 500 that have IR texture pattern residual 501 such as pixel position 504 and image corrected for IR texture 600 having an average luminance at the same plurality of pixel positions within image corrected for IR texture 600 that is less than the average luminance at the plurality of pixel positions within image with IR texture 500. The average luminance may be determined using any suitable technique or techniques. For example, the luminance at a particular pixel position may be determined from R, G, B pixel values as $k_1*R+k_2*G+k_3*B$ where $k_1$, $k_2$, $k_3$ are conversions constants such as $k_1\sim0.2$-$0.3$, $k_2\sim0.5$-$0.6$, $k_3\sim0.07$-$0.2$, or the like. In other examples, the luminance at a particular pixel position may be determined as $k_1*R^2+k_2*G^2+k_3*B^2$. Furthermore, although discussed with respect averaging the pixel position luminance values, other techniques may be used determining a median of the pixel position luminance values.

As discussed, the correction, reduction, or elimination of IR texture pattern residual 501 from raw image data to generate image corrected for IR texture 600 and the retention of IR texture pattern residual 501 from raw image data to generate image with IR texture 500 may be attained by applying different color correction transforms or matrices to the raw image data (i.e., left (L) raw image 111 and right (R) raw image 112). The color correction transforms or matrices may include any suitable color correction transforms or matrices that may be tuned or designed or the like relative to the image sensor from which the raw image data was attained. In an embodiment, the color correction transforms or matrices have at least one different color correction transform or matrix coefficients. In an embodiment, the color correction transforms or matrices have different color correction transform or matrix coefficients such that all of the color correction transform or matrix coefficients are different. For example, any number of color correction transform or matrix coefficients, $a_{11}$-$a_{34}$, for correcting for IR texture residuals may be different with respect to any number of color correction transform or matrix coefficients, $b_{11}$-$b_{34}$, for retaining for IR texture residuals.

In some embodiments, the color images with IR correction (e.g., one or more color images with IR correction 113) may be saved to memory for eventual presentment to a user for eventual use in computer vision applications or the like. In other embodiments, the color images with IR correction (e.g., one or more color images with IR correction 113) may be further processed by an imaging pipeline prior to being saved to memory. Similarly, in some embodiments, the color images with IR texture (e.g., color images of left and right images with IR texture 114) may be saved to memory or provided to a stereo matching module or component for eventual use in the generation of a depth map or image and/or for use in computer vision applications or the like. In other embodiments, the color images with IR texture (e.g., color images of left and right images with IR texture 114) may be further processed by a separate imaging pipeline.

Figure 7:
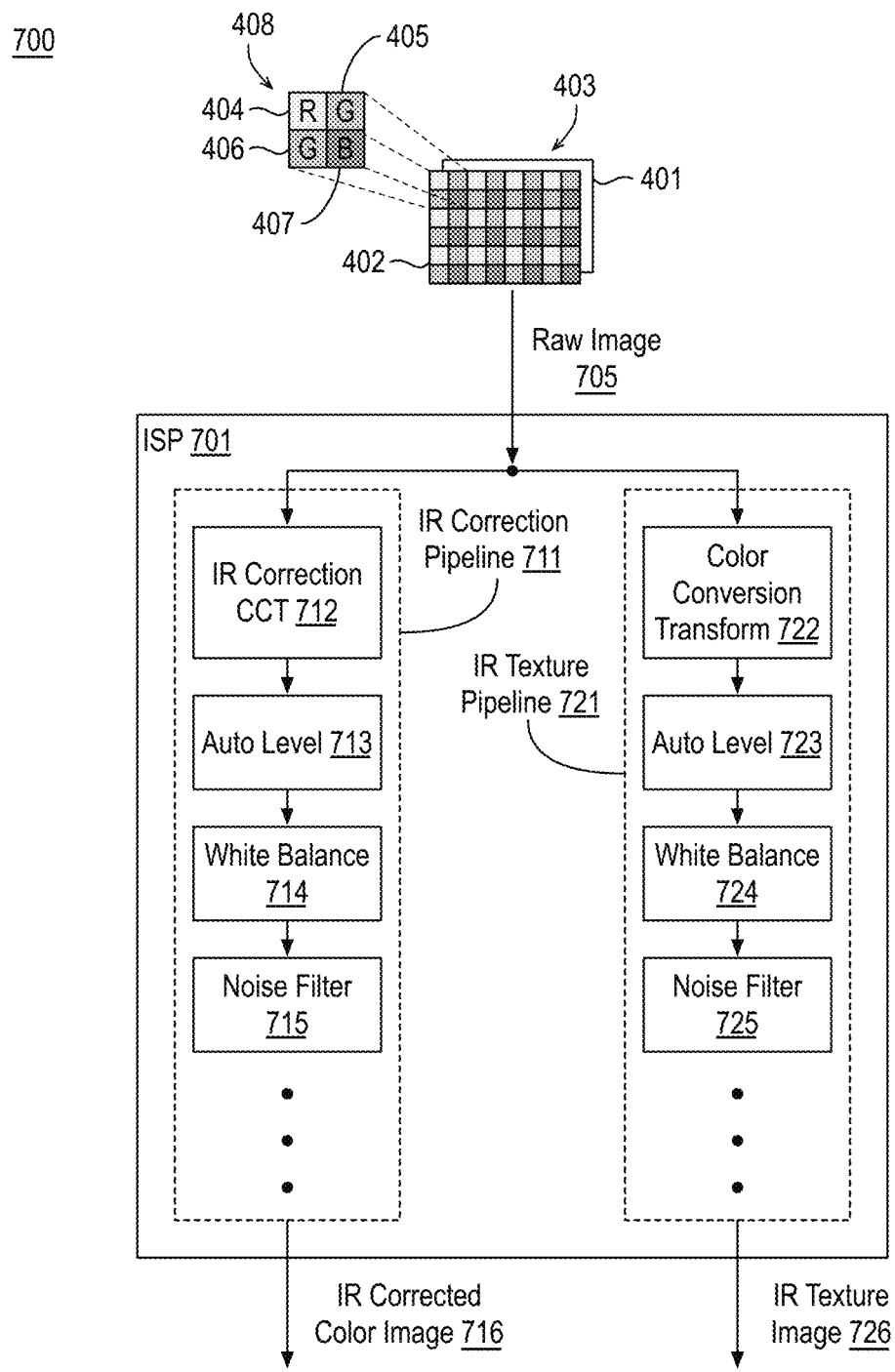
FIG. 7 illustrates an example system including a dual pipeline image signal processor.

FIG. 7 illustrates an example system 700 including a dual pipeline image signal processor, arranged in accordance with at least some implementations of the present disclosure. As shown in FIG. 7, system 700 may include image sensor 401 and color filter array 402 as discussed herein with respect to FIG. 4. For example, image sensor 401 and color filter array 402 may be implemented by one or both of left camera 104 and right camera 105. As shown, image sensor 401 generates raw image data 705 based on an image capture of a scene having an IR texture projection such that raw image data 705 includes an IR texture pattern residual as discussed herein. Also, as shown, system 700 includes an image signal processor (ISP) 701 implementing an IR correction pipeline 711 and an IR texture pipeline 721. In an embodiment, ISP 701 may be implemented as ISP 101 in any system or device discussed herein.

IR correction pipeline 711 includes an IR correction color correction transform (CCT) module 712 to implement a color correction transform to correct, reduce, or eliminate an IR residual texture pattern as discussed herein. IR correction CCT module 712 may apply the IR correction color correction transform directly to raw image data 705 or to image data corresponding to raw image data 705. For example, a component or module of ISP 701 within IR correction pipeline 711 and before IR correction CCT module 712 or prior to both IR correction pipeline 711 and IR texture pipeline 721 may apply smoothing, outlier removal, or other operations to preprocess raw image data 705 prior to processing by IR correction CCT module 712. In any event, IR correction CCT module 712 applies a color correction transform or matrix to raw image data 705 or to image data corresponding to raw image data 705 to generate color image data corresponding thereto having the IR texture pattern residual removed. For example, raw image data 705 or image data corresponding to raw image data 705 may be in a sub-pixel signal value space and the color correction transform or matrix may translate raw image data 705 or image data corresponding to raw image data 705 into a pixel space such that each pixel location of the output image data has a plurality of color channel values (e.g., R-G-B values) as discussed elsewhere herein such as with respect to Equation (1).

Furthermore, after such conversion to remove the IR texture pattern residual, IR correction pipeline 711 may include any suitable image processing stages, components or modules as illustrated with respect to auto level module 713, white balance module 714, and noise filter 715. For example, auto level module 713 may provide linear adjustments of pixel intensities for improved contrast, white balance module 714 may provide global adjustment of the intensities of the colors to accurately represent neutral colors, and noise filter 715 to reduce noise in the image. In addition or in the alternative, IR correction pipeline 711 may include a gamma correction module, a tone correction module, or other processing modules. Such modules may be implemented using any suitable technique or techniques. As shown, after such processing, IR correction pipeline 711 provides an IR corrected color image 716, which may be provided as one or more color images with IR correction 113 as discussed herein.

Also as shown in FIG. 7, IR texture pipeline 721 includes a color correction transform module 722 to implement a color correction transform to retain an IR residual texture pattern as discussed herein. Color correction transform module 722 may apply the IR correction color correction transform directly to raw image data 705 or to image data corresponding to raw image data 705. For example, a component or module of ISP 701 within IR texture pipeline 721 and before color correction transform module 722 or prior to both IR correction pipeline 711 and IR texture pipeline 721 may apply smoothing, outlier removal, or other operations to preprocess raw image data 705 prior to processing by color correction transform module 722. Color correction transform module 722 applies a color correction transform or matrix to raw image data 705 or to image data corresponding to raw image data 705 to generate color image data corresponding thereto that retains an IR texture pattern as discussed herein. For example, raw image data 705 or image data corresponding to raw image data 705 may be in a sub-pixel signal value space and the color correction transform or matrix may translate raw image data 705 or image data corresponding to raw image data 705 into a pixel space such that each pixel location of the output image data has a plurality of color channel values (e.g., R-G-B values) as discussed elsewhere herein such as with respect to Equation (2).

Furthermore, after such color conversion, IR texture pipeline 721 may include any suitable image processing stages, components or modules as illustrated with respect to auto level module 723, white balance module 724, and noise filter 725, which may provide processing as discussed with respect to IR correction pipeline 711. In addition or in the alternative, IR texture pipeline 721 may include a gamma correction module, a tone correction module, or other processing modules. Such modules may be implemented using any suitable technique or techniques. As shown, after such processing, IR texture pipeline 721 provides an IR texture color image 726, which may be provided as color images of left and right images with IR texture 114 as discussed herein.

As shown, in an embodiment, ISP 701 includes IR correction pipeline 711 and IR texture pipeline 721. In such an embodiment, IR correction pipeline 711 may process one or both of left and right images (e.g., system 700 may include another image sensor and color filter array analogous to image sensor 401 and color filter array 402 such that left and right images of a scene are obtained as discussed herein) and IR texture pipeline 721 may process both the left and right images. In another embodiment, ISP 701 includes a second IR texture pipeline and/or a second IR correction pipeline such that the left and right images may be processed at least partially in parallel.

Figure 8:
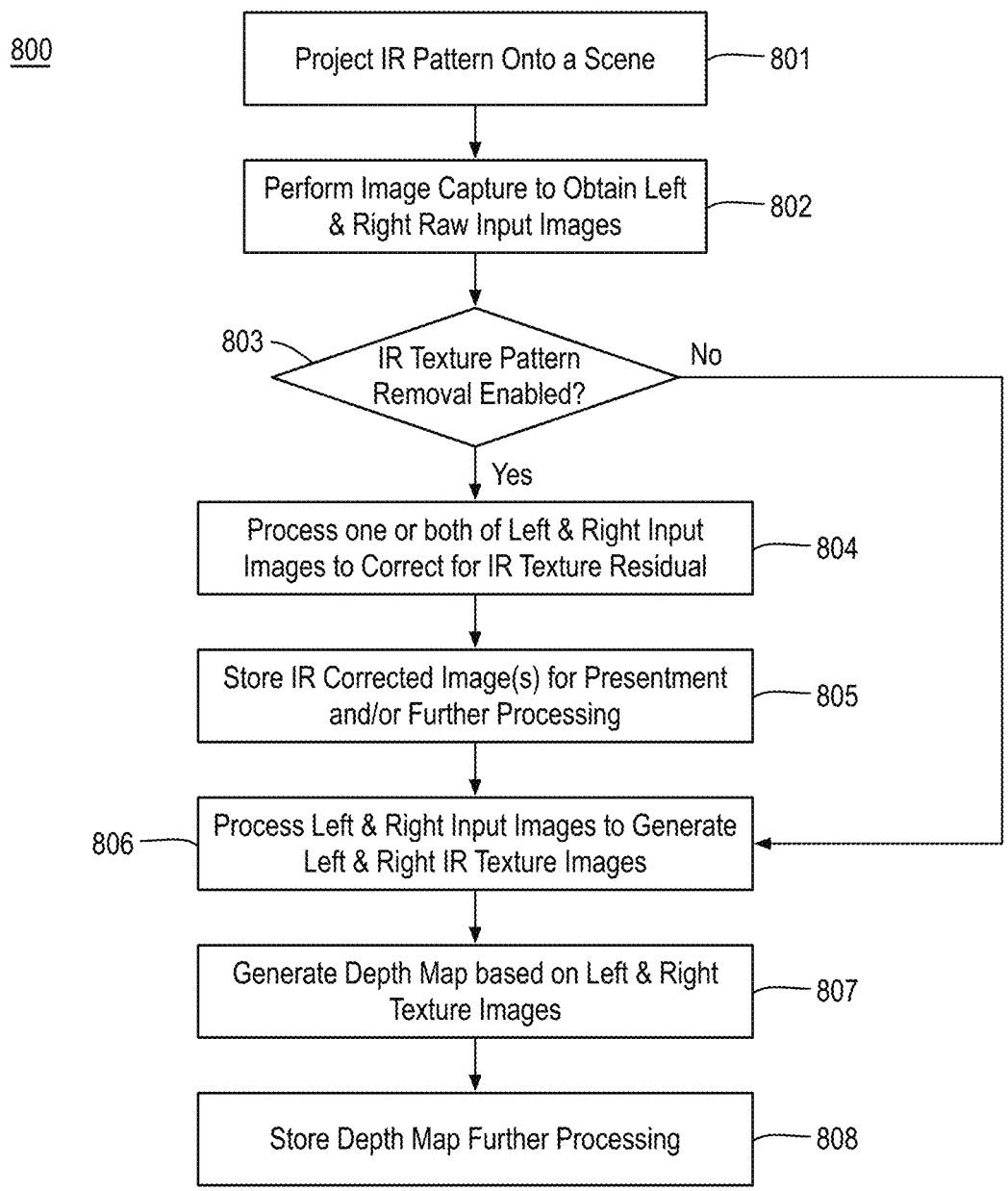
FIG. 8 illustrates an example process for correcting for an IR texture pattern residual and generating depth maps.

FIG. 8 illustrates an example process 800 for correcting for an IR texture pattern residual and generating depth maps, arranged in accordance with at least some implementations of the present disclosure. Process 800 may include one or more operations 801-808 as illustrated in FIG. 8. Process 800 or portions thereof may be performed by any device or system discussed herein to generate depth maps or images using color images having an IR texture pattern and to remove an IR texture pattern residual from raw image data to generate a color image with the IR texture pattern corrected or removed. Process 800 or portions thereof may be repeated for any number of raw input images, or the like.

Process 800 begins at operation 801, where an IR pattern is projected onto a scene. The IR pattern may be projected onto any scene using any suitable technique or techniques. In an embodiment, an IR projector projects a predetermined IR pattern onto a scene. Processing continues at operation 802, where an image capture is performed to obtain left and right raw input image data of the scene during projection of the IR pattern. As discussed, the obtain left and right raw input image data may be attained by left and right cameras each having an image sensor and a corresponding color filter array such that the left and right cameras are aligned horizontally for stereo matching. As discussed, due to imperfections of the color filter array, the raw input image data may be include an IR texture pattern residual corresponding to the projection of the IR pattern.

Processing continues at decision operation 803, where a determination may be made as to whether IR texture pattern removal is enabled. For example, IR texture pattern removal may be enabled or disabled by a user, by system settings, or the like based on whether color images with removed IR texture patterns are needed for presentment to a user, for use in computer vision, etc. or not. If IR texture pattern removal is disabled, processing continues at operation 806 as discussed below.

If IR texture pattern removal is enabled, processing continues at operation 804, where one or both of the left raw input image data and the right raw input image data are processed to correct for the IR texture pattern residual as discussed herein to generate left and/or right color images corrected for the IR texture pattern residual. For example, the raw input image data or image data corresponding to the raw input image data may be processed via application of a color correction transform or matrix as discussed herein that has been tuned or designed to remove the IR signal from the raw input image data or image data corresponding to the raw input image data. In an embodiment, the color correction transform or matrix transforms raw input image data from a sub-pixel domain including sub-pixel signals corresponding to color filter array elements to a pixel domain such that each pixel location includes multiple color channel values such as R-G-B color channel values.

Processing continues at operation 805, where the resultant color image(s) corrected for the IR texture pattern residual may be stored in memory for eventual presentment to a user (e.g., via a display device) and/or for further processing such as computer vision processing or the like. The color image(s) corrected for the IR texture pattern residual may be stored in any suitable format such as an image format having an R value, a G value, and a B value for each pixel location thereof.

Processing continues from operation 805 or decision operation 803 at operation 806, where the left raw input image data and the right raw input image data are processed to generate left and right images having IR texture (e.g., left and right IR texture images). For example, the raw input image data or image data corresponding to the raw input image data may be processed via application of a color correction transform or matrix as discussed herein that has been tuned or designed to retain the IR signal from the raw input image data or image data corresponding to the raw input image data. In an embodiment, as discussed with respect to operation 805, the color correction transform or matrix transforms raw input image data from a sub-pixel domain including sub-pixel signals corresponding to color filter array elements to a pixel domain such that each pixel location includes multiple color channel values such as R-G-B color channel values.

Processing continues at operation 807, where a depth map or image is generated based on the left and right texture images generated at operation 806. The depth map or image may be generated using any suitable technique or techniques such as stereoscopic search techniques. Processing continues at operation 808, where the resultant depth map or image may be stored in memory for further processing such as computer vision processing or the like. The depth map or image may be stored in any suitable format such as an image format having a depth or disparity value for each pixel location of the depth map or image.

As discussed, an IR texture pattern residual may be removed from input image data to generate an output image having the IR texture pattern residual corrected, reduced, or eliminated. For example, tuning a color correction transform or matrix may include changing the weights of the sub-pixel responses to optimize an image sensor such as a CMOS sensor to perform demosaicing of the pattern provided by a color filter array such as an R-G-G-B Bayer pattern. As discussed, blue sub-pixels will also respond to green and red light as well as IR light (e.g., 850 nm light. Similarly, red sub-pixels will respond to green and blue light as well as IR light and green sub-pixels will respond to blue and red light as well as IR light. Such responses to IR light will be different for each sub-pixel color (and dependent upon the sensor being implemented). By tuning color correction transform or matrix (e.g., choosing color correction coefficients) the IR signal is negated or minimized in the IR corrected color images. Similarly, by tuning another color correction transform or matrix (e.g., choosing color correction coefficients), the IR signal is retained (and the discussed cross sub-pixel contaminations may be reduced or eliminated) in the IR textured color images (e.g., those images that retain an IR correction residual).

The discussed, systems, devices, techniques, and articles provide IR textured color images for stereoscopic image matching and IR corrected color images for display or use in computer vision or the like with the advantages of reduced cost (e.g., no additional IR sensor or RGB-IR sensor or the like is needed), with increased frame rates (e.g., no multiplexing of images taken with IR texture and images taken without IR texture is needed), and with alignment in time of the depth images the IR corrected color images (e.g., the IR corrected color images and the IR textured color images may be processed substantially simultaneously).

Figure 9:
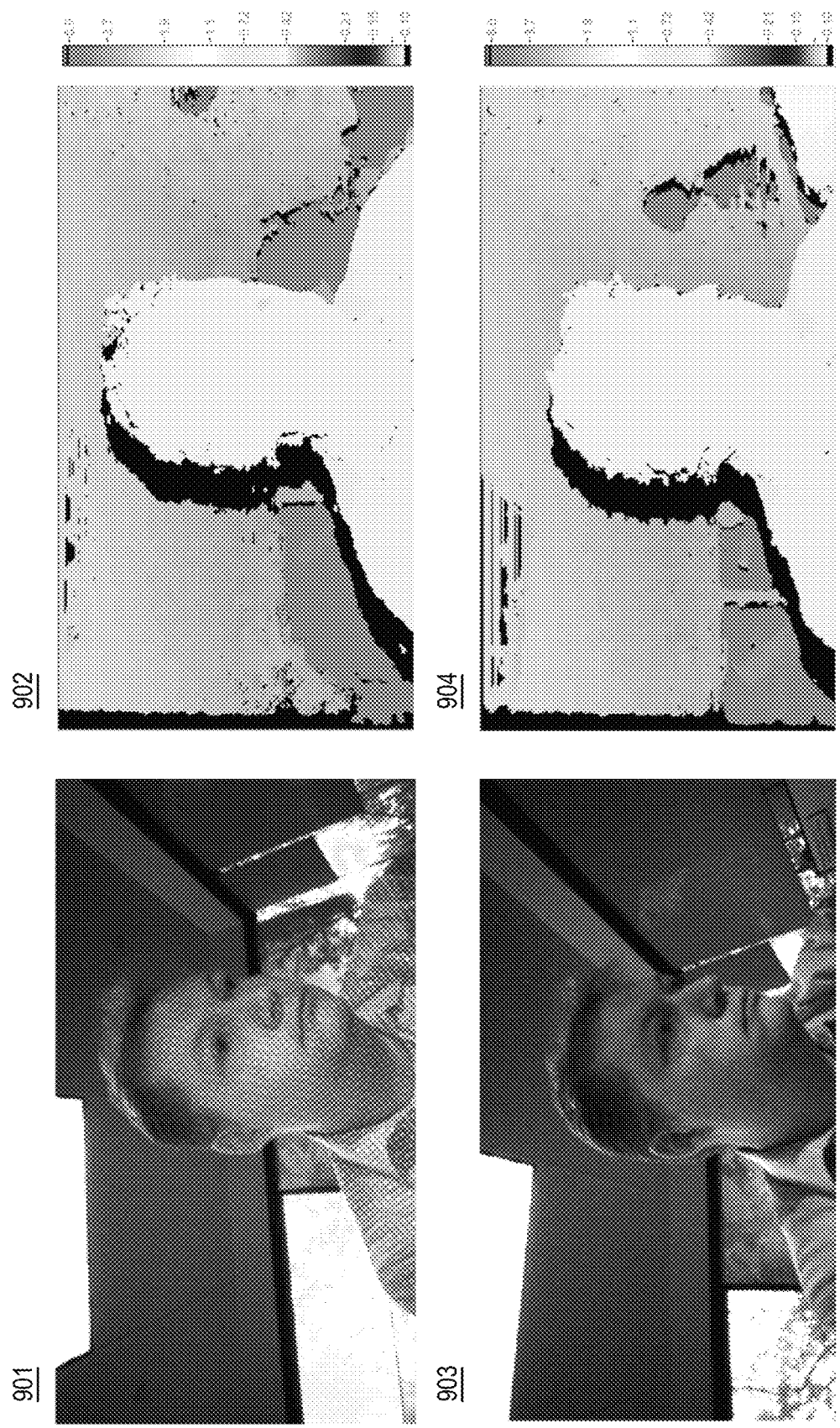
FIG. 9 illustrates an example IR textured color image, an example IR corrected color image and corresponding example depth images.

FIG. 9 illustrates an example IR textured color image 901, an example IR corrected color image 903 and corresponding example depth images 902, 904, arranged in accordance with at least some implementations of the present disclosure. As shown in FIG. 9, IR textured color image 901 includes an IR texture residual pattern, which is most evident on the shirt and face of the subject. For example, IR textured color image 901 may be a left or right IR textured color image as discussed herein. Stereoscopic image matching may be performed using IR textured color image 901 and a corresponding IR textured color image (e.g., a right image if textured color image 901 is a left image or vice versa; not shown) to generate depth image 903. For example, depth image 903 may have excellent quality due, at least in part, to the IR texture residual pattern of textured color image 901 and the corresponding IR textured color image.

Also as shown in FIG. 9, in IR corrected color image 903, the IR texture residual pattern has been corrected, reduced, or eliminated, which is evident upon comparison to IR textured color image 901. For example, IR corrected color image 903 and IR textured color image 901 are generated based on similar raw input image data via the application of differing color conversion transforms as discussed herein. Stereoscopic image matching may be performed using an IR textured color image corresponding to IR corrected color image 903 (not shown) and another IR textured color image (e.g., a right image if the IR textured color image corresponding to IR corrected color image 903 is a left image or vice versa; not shown) to generate depth image 904. For example, since depth image 904 is based on IR textured color images, depth image 904 retains excellent results. Furthermore, IR corrected color image 903 is attained for presentment (e.g., such that the unsightly IR texture residual pattern is removed) or for use in computer vision, etc. (e.g., where the IR texture residual pattern may cause processing failures).

Figure 10:
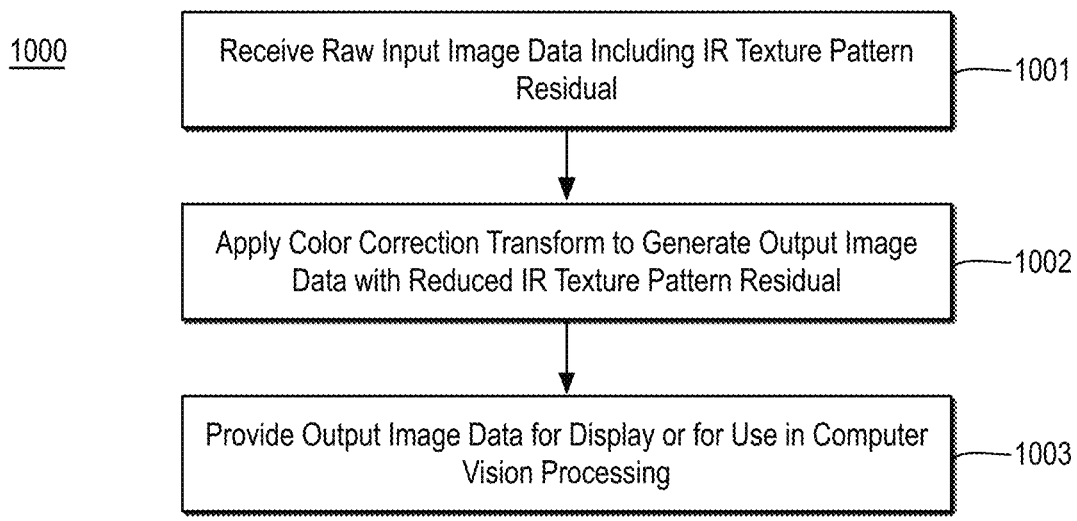
FIG. 10 is a flow diagram illustrating an example process for correcting for an IR texture pattern residual in raw image data.

FIG. 10 is a flow diagram illustrating an example process 1000 for correcting for an IR texture pattern residual in raw image data, arranged in accordance with at least some implementations of the present disclosure. Process 1000 may include one or more operations 1001-1003 as illustrated in FIG. 10. Process 1000 may form at least part of an IR texture pattern residual removal process. By way of non-limiting example, process 1000 may form at least part of an IR texture pattern residual removal process as performed by any device, system, or combination thereof as discussed herein. Furthermore, process 1000 will be described herein with reference to system 1100 of FIG. 11, which may perform one or more operations of process 1000.

Figure 11:
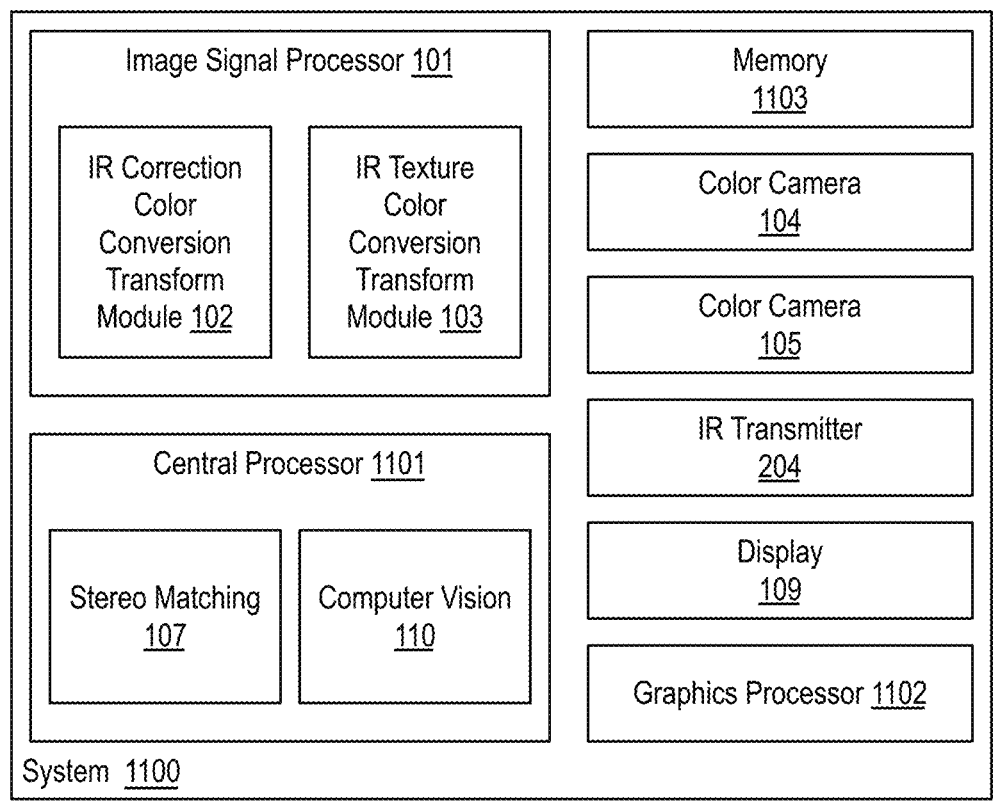
FIG. 11 is an illustrative diagram of an example system for correcting for an IR texture pattern residual in raw image data.

FIG. 11 is an illustrative diagram of an example system 1100 for correcting for an IR texture pattern residual in raw image data, arranged in accordance with at least some implementations of the present disclosure. As shown in FIG. 11, system 1100 may include a central processor 1101, a graphics processor 1102, a memory 1103, color cameras 104, 105, IR transmitter 204, ISP 101 and/or display 109. Also as shown, central processor 1101 may include or implement stereo matching module 107 and computer vision module 110 and ISP 101 may include or implement IR correction color conversion transform module 102 and IR texture color conversion transform module 103. In the example of system 1100, memory 1103 may store raw image data, color images, color image data, depth images, depth image data, image data, and/or any other data as discussed herein.

As shown, in some embodiments, stereo matching module 107 and computer vision module 110 are implemented by central processor 1101 and IR correction color conversion transform module 102 and IR texture color conversion transform module 103 are implemented by ISP 101. In some embodiments, one or both of stereo matching module 107 and computer vision module 110 are implemented by ISP 101 or graphics processor 1102. In some embodiments, one or both of IR correction color conversion transform module 102 and IR texture color conversion transform module 103 are implemented by central processor 1101 or graphics processor 1102.

Graphics processor 1102 may include any number and type of graphics processing units that may provide the discussed color conversion, stereo matching, and computer vision operations and/or other operations as discussed herein. For example, graphics processor 1102 may include circuitry dedicated to manipulate image data, or the like obtained from memory 1103. ISP 101 may include any number and type of image signal or image processing units that may provide the discussed color conversion, stereo matching, and computer vision operations and/or other operations as discussed herein. For example, ISP 101 may include circuitry dedicated to manipulate image data such as an ASIC or the like. Central processor 1101 may include any number and type of processing units or modules that may provide control and other high level functions for system 1100 and/or provide the discussed color conversion, stereo matching, and computer vision operations and/or other operations as discussed herein. Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory.

In an embodiment, one or more or portions of stereo matching module 107, computer vision module 110, IR correction color conversion transform module 102, and IR texture color conversion transform module 103 may be implemented via an execution unit (EU) of ISP 101 or graphics processor 1102. The EU may include, for example, a programmable logic or circuitry such as a logic core or cores that may provide a wide array of programmable logic functions. In an embodiment, one or more or portions of stereo matching module 107, computer vision module 110, IR correction color conversion transform module 102, and IR texture color conversion transform module 103 may be implemented via dedicated hardware such as fixed function circuitry or the like of ISP 101 or graphics processor 1102. Fixed function circuitry may include dedicated logic or circuitry and may provide a set of fixed function entry points that may map to the dedicated logic for a fixed purpose or function.

As discussed herein, cameras 104, 105 may attain raw image data of a scene including an IR texture pattern residual from IR light emitted by infrared transmitter 204 to illuminate the scene. In an embodiment, one or both of cameras 104, 105 include a CMOS sensor having a red-green-blue filter array thereon. Display 109 may display color images corrected for the IR texture pattern, depth images, or other graphical interface information (e.g., responses based on gesture or face recognition or the like) generated based on such images and/r raw image data.

Returning to discussion of FIG. 10, process 1000 may begin at operation 1001, where raw input image data including an IR texture pattern residual from an IR texture pattern projected on a scene during an image capture of the scene may be received. For example, IR transmitter 204 may project the IR texture pattern onto a scene and one or both of cameras 104, 105 may generate raw input image data including the IR texture pattern residual. In an embodiment, an image sensor of one or both of cameras 104, 105 generates the raw input image data. In an embodiment, the raw input image data includes an IR texture pattern residual from the IR texture pattern. The raw input image data may be received from one of cameras 104, 105 by IR correction color conversion transform module 102 as implemented by ISP 101.

Processing continues at operation 1002, where a color correction transform is applied to the raw input image data or image data corresponding to the raw input image data to generate output image data such that the color correction transform is to correct for the IR texture pattern residual to provide the output image data having a reduced IR texture pattern residual with respect to the raw input image data. The color correction transform may be applied using any suitable technique or techniques. In an embodiment, applying the color correction transform includes applying the color correction transform directly to the raw input image data. As used herein, the term raw input image data indicates data from an image sensor or an image preprocessor of the image sensor. In an embodiment, applying the color correction transform includes applying the color correction transform to image data corresponding to the raw input image data such that the image data is in the same format as the raw input image data but has been preprocessed in some way. In an embodiment, the color correction transform is applied by IR correction color conversion transform module 102 as implemented by ISP 101.

In an embodiment, applying the color correction transform includes applying the color correction transform to a plurality of sub-pixel signals of the raw input image data or image data corresponding to the raw input image data to generate a corresponding single pixel of the output image data such that the sub-pixel signals include at least one red sub-pixel signal value, at least one green sub-pixel signal value, and at least one blue sub-pixel signal value. In an embodiment, the plurality of sub-pixel signals consists of a single red sub-pixel signal value, two green sub-pixel signal values, and a single blue sub-pixel signal value and the single pixel of the output image data comprises a red pixel value, a green pixel value, and a blue pixel value. For example, application of the color correction transform may provide a transform from a sub-pixel space (including regions of red, green, green, blue signals) to a pixel space (including a red, green, and blue value) for each pixel.

In an embodiment, the raw input image data processed at operation 1002 corresponds to left or right raw input image data (e.g., from a left or right camera) for stereoscopic image matching. In an embodiment, second raw input image data corresponding to the other of the left or right camera may be received and the color correction transform (e.g., the same color correction transform) may be applied to the second raw input image data or image data corresponding to the second raw input image data to generate second output image data that is also corrected for IR texture pattern residual. In such embodiments, color images corrected for the IR texture pattern residual corresponding to both the left and right cameras (or image sensors) may be available for presentment to a user or for use in computer vision.

Processing continues at operation 1003, where the output image data is provided for display to a user or for use in computer vision processing or the like. In an embodiment, the output image data is stored to memory 1103. In an embodiment, the output image data is provided to computer vision module 110 for further processing. In an embodiment, the output image data is provided to display 109 for presentment to a user.

As discussed, process 1000 provides for correcting for an IR texture pattern residual in raw image data to generate output image data such that the output image data has a reduced IR texture pattern residual with respect to the raw image data. In an embodiment, the reduced IR texture pattern residual is no IR texture pattern residual or an undetectable reduced IR texture pattern residual. As used herein the term reduced IR texture pattern residual is meant to include the IR texture pattern residual has been eliminated.

In an embodiment, process 1000 further includes applying a second color correction transform (different with respect to the color correction transform implemented at operation 1002) to the raw input image data or the image data corresponding to the raw input image data to generate IR texture output image data. For example, the second color correction transform is to retain the IR texture pattern residual within the IR texture output image data and the output image data has a reduced IR texture pattern residual with respect to the IR texture output image data. In an embodiment, a plurality of pixel positions within the IR texture output image data include the IR texture pattern residual and the output image data having a reduced IR texture pattern residual with respect to the IR texture output image data is indicated by the IR texture output image data having a first average luminance at the plurality of pixel positions within the IR texture output image data and the output image data having a second average luminance at the same plurality of pixel positions within the output image data that is less than the first average luminance.

In an embodiment, the second color correction transform and the color correction transform are implemented in different image processing pipelines of ISP 101. For example, the color correction transform may be implemented in a first image processing pipeline of ISP 101 and the second color correction transform may be implemented in a second image processing pipeline of ISP 101.

Furthermore, as discussed with respect to operation 1002, the raw input image data processed at operation 1002 may correspond to left or right raw input image data (e.g., from a left or right camera) for stereoscopic image matching and second raw input image data corresponding to the other of the left or right camera may be generated and/or received. In an embodiment, the raw input image data is generated by an image sensor and the second raw input image data is generated by a second image sensor based on a second image capture of the scene having the projection of the IR texture pattern. For example, the second raw input image data includes a second IR texture pattern residual from the IR texture pattern projected onto the scene. In an embodiment, the first and second image sensors are horizontally aligned with respect to the scene to provide for stereo matching. In an embodiment, a depth map may be generated based on the IR texture output image data corresponding to the raw input image data (as discussed above) and second IR texture output image data corresponding to the second raw input image data. For example, the second IR texture output image data may be generated by applying the second color correction transform to the second raw input image data or image data corresponding thereto. In an embodiment, generating the depth map includes performing stereoscopic image matching based on the IR texture image and the second IR texture image.

Process 1000 may be repeated any number of times either in series or in parallel for any number raw input images or the like. For example, process 1000 may provide for correcting for an IR texture pattern residual and generating depth maps for any number of image capture instances during imaging or video capture or the like.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
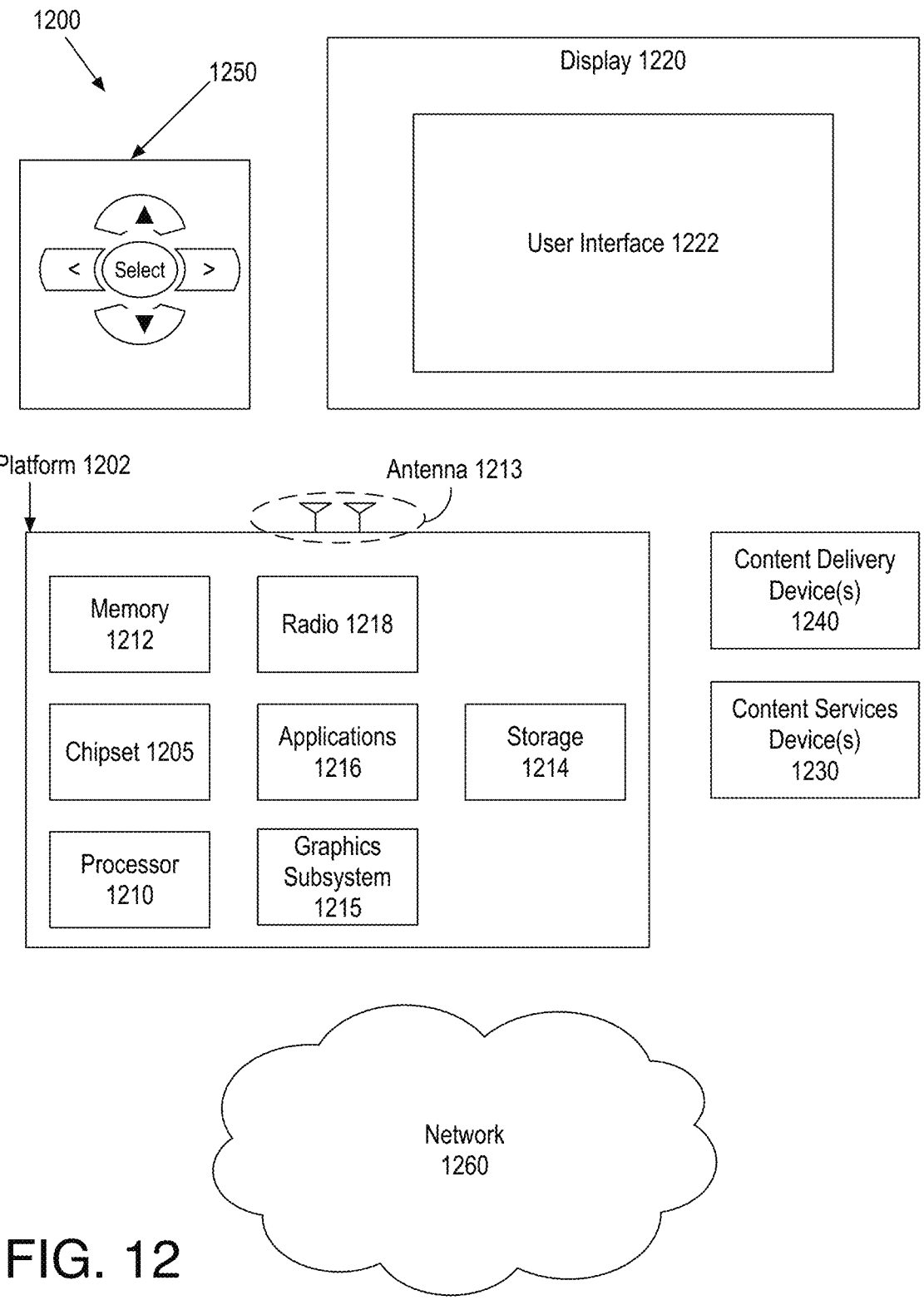
FIG. 12 is an illustrative diagram of an example system.

FIG. 12 is an illustrative diagram of an example system 1200, arranged in accordance with at least some implementations of the present disclosure. In various implementations, system 1200 may be a mobile system although system 1200 is not limited to this context. System 1200 may implement and/or perform any modules or techniques discussed herein. For example, system 1200 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1200 may be implemented via a cloud computing environment.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of navigation controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, navigation controller 1250 may not be a separate component but may be integrated into platform 1202 and/or display 1220.

The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
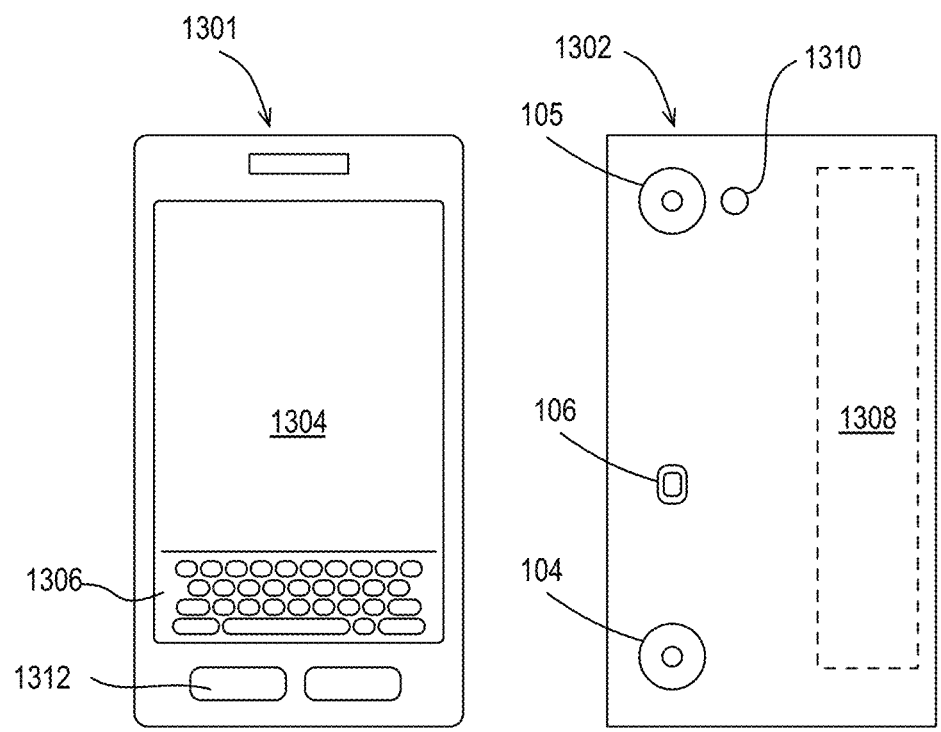
FIG. 13 illustrates an example small form factor device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, other systems discussed herein or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, color camera 104, color camera 105, infrared transmitter 204, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include color cameras 104, 105 and a flash 1310 integrated into back 1302 (or elsewhere) of device 1300. In other examples, color cameras 104, 105 and flash 1310 may be integrated into front 1301 of device 1300 or both front and back sets of cameras may be provided. Color cameras 104, 105 and a flash 1310 may be components of a camera module to originate color image data with IR texture correction that may be processed into an image or streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, an imaging device comprises an infrared (IR) projector to project an IR texture pattern onto a scene, an image sensor to generate raw input image data based on an image capture of the scene comprising the projection of the IR texture pattern, such that the raw input image data comprises an IR texture pattern residual from the IR texture pattern, and an image signal processor coupled to the image sensor, the image signal processor to receive the raw input image data and to apply a color correction transform to the raw input image data or image data corresponding to the raw input image data to generate output image data, such that the color correction transform is to correct for the IR texture pattern residual such that the output image data has a reduced IR texture pattern residual with respect to the raw input image data.

In one or more second embodiments, further to the first embodiments, the image signal processor is further to apply a second color correction transform to the raw input image data or the image data corresponding to the raw input image data to generate IR texture output image data, such that the second color correction transform is to retain the IR texture pattern residual within the IR texture output image data and the output image data has a reduced IR texture pattern residual with respect to the IR texture output image data.

In one or more third embodiments, further to the first or second embodiments, a plurality of pixel positions within the IR texture output image data comprise the IR texture pattern residual and such that the output image data having a reduced IR texture pattern residual with respect to the IR texture output image data comprises the IR texture output image data having a first average luminance at the plurality of pixel positions within the IR texture output image data and the output image data having a second average luminance at the same plurality of pixel positions within the output image data that is less than the first average luminance.

In one or more fourth embodiments, further to the first through third embodiments, the color correction transform is implemented in a first image processing pipeline of the image signal processor and the second color correction transform is implemented in a second image processing pipeline of the image signal processor.

In one or more fifth embodiments, further to the first through fourth embodiments, the imaging device further comprises a second image sensor to generate second raw input image data based on a second image capture of the scene having the projection of the IR texture pattern, such that the second raw input image data comprises a second IR texture pattern residual from the IR texture pattern, and such that the first and second image sensors are horizontally aligned with respect to the scene In one or more sixth embodiments, further to the first through fifth embodiments, the imaging device further comprises a processor coupled to the image signal processor, the processor to generate a depth map based on the IR texture output image data corresponding to the raw input image data and second IR texture image data corresponding to the second raw input image data.

In one or more seventh embodiments, further to the first through sixth embodiments, the processor to generate the depth map comprises the processor to perform stereoscopic image matching based on the IR texture image and the second IR texture image.

In one or more eighth embodiments, further to the first through seventh embodiments, the image signal processor is further to receive the second raw input image data and to apply the color correction transform to the second raw input image data or image data corresponding to the second raw input image data to generate second output image data.

In one or more ninth embodiments, further to the first through eighth embodiments, the image signal processor to apply the color correction transform comprises the image signal processor to apply the color correction transform to a plurality of sub-pixel signals of the raw input image data or image data corresponding to the raw input image data to generate a corresponding single pixel of the output image data, such that the sub-pixel signals comprises at least one red sub-pixel signal value, at least one green sub-pixel signal value, and at least one blue sub-pixel signal value.

In one or more tenth embodiments, further to the first through ninth embodiments, the plurality of sub-pixel signals consists of a single red sub-pixel signal value, two green sub-pixel signal values, and a single blue sub-pixel signal value and the single pixel of the output image data comprises a red pixel value, a green pixel value, and a blue pixel value.

In one or more eleventh embodiments, further to the first through tenth embodiments, the image sensor comprises a complementary metal-oxide-semiconductor (CMOS) sensor having a red-green-blue color filter array thereon and the image signal processor comprises an application-specific integrated circuit (ASIC).

In one or more twelfth embodiments, method for image processing comprises receiving raw input image data comprising an infrared (IR) texture pattern residual from an IR texture pattern projected on a scene during an image capture of the scene, applying a color correction transform to the raw input image data or image data corresponding to the raw input image data to generate output image data, wherein the color correction transform is to correct for the IR texture pattern residual such that the output image data has a reduced IR texture pattern residual with respect to the raw input image data, and providing the output image data for display to a user or for use in computer vision processing.

In one or more thirteenth embodiments, further to the twelfth embodiments, the method further comprises applying a second color correction transform to the raw input image data or the image data corresponding to the raw input image data to generate IR texture output image data, wherein the second color correction transform is to retain the IR texture pattern residual within the IR texture output image data and the output image data has a reduced IR texture pattern residual with respect to the IR texture output image data.

In one or more fourteenth embodiments, further to the twelfth or thirteenth embodiments, a plurality of pixel positions within the IR texture output image data comprise the IR texture pattern residual and wherein the output image data having a reduced IR texture pattern residual with respect to the IR texture output image data comprises the IR texture output image data having a first average luminance at the plurality of pixel positions within the IR texture output image data and the output image data having a second average luminance at the same plurality of pixel positions within the output image data that is less than the first average luminance.

In one or more fifteenth embodiments, further to the twelfth through fourteenth embodiments, the method further comprises receiving second raw input image data based on a second image capture of the scene having the projection of the IR texture pattern, wherein the second raw input image data comprises a second IR texture pattern residual from the IR texture pattern, and wherein the raw input image data and the second raw input image data are from first and second image sensors that are horizontally aligned with respect to the scene.

In one or more sixteenth embodiments, further to the twelfth through fifteenth embodiments, the method further comprises generating a depth map based on a first IR texture image corresponding to the raw input image data and a second IR texture image corresponding to the second raw input image data.

In one or more seventeenth embodiments, further to the twelfth through sixteenth embodiments, generating the depth map comprises performing stereoscopic image matching based on the IR texture image and the second IR texture image.

In one or more eighteenth embodiments, further to the twelfth through seventeenth embodiments, applying the color correction transform comprises applying the color correction transform to a plurality of sub-pixel signals of the raw input image data or image data corresponding to the raw input image data to generate a corresponding single pixel of the output image data, wherein the sub-pixel signals comprises at least one red sub-pixel signal value, at least one green sub-pixel signal value, and at least one blue sub-pixel signal value.

In one or more nineteenth embodiments, further to the twelfth through eighteenth embodiments, the plurality of sub-pixel signals consists of a single red sub-pixel signal value, two green sub-pixel signal values, and a single blue sub-pixel signal value and the single pixel of the output image data comprises a red pixel value, a green pixel value, and a blue pixel value.

In one or more twentieth embodiments, at least one machine readable medium comprises a plurality of instructions that, in response to being executed on a device, cause the device to perform image processing by receiving raw input image data comprising an infrared (IR) texture pattern residual from an IR texture pattern projected on a scene during an image capture of the scene, applying a color correction transform to the raw input image data or image data corresponding to the raw input image data to generate output image data, wherein the color correction transform is to correct for the IR texture pattern residual such that the output image data has a reduced IR texture pattern residual with respect to the raw input image data, and providing the output image data for display to a user or for use in computer vision processing.

In one or more twenty-first embodiments, further to the twentieth embodiments, the machine readable medium comprises further instructions that, in response to being executed on the device, cause the device to perform image processing by applying a second color correction transform to the raw input image data or the image data corresponding to the raw input image data to generate IR texture output image data, wherein the second color correction transform is to retain the IR texture pattern residual within the IR texture output image data and the output image data has a reduced IR texture pattern residual with respect to the IR texture output image data.

In one or more twenty-second embodiments, further to the twentieth or twenty-first embodiments, a plurality of pixel positions within the IR texture output image data comprise the IR texture pattern residual and wherein the output image data having a reduced IR texture pattern residual with respect to the IR texture output image data comprises the IR texture output image data having a first average luminance at the plurality of pixel positions within the IR texture output image data and the output image data having a second average luminance at the same plurality of pixel positions within the output image data that is less than the first average luminance.

In one or more twenty-third embodiments, further to the twentieth through twenty-second embodiments, the machine readable medium comprises further instructions that, in response to being executed on the device, cause the device to perform image processing by receiving second raw input image data based on a second image capture of the scene having the projection of the IR texture pattern, wherein the second raw input image data comprises a second IR texture pattern residual from the IR texture pattern, and wherein the raw input image data and the second raw input image data are from first and second image sensors that are horizontally aligned with respect to the scene.

In one or more twenty-fourth embodiments, further to the twentieth through twenty-third embodiments, the machine readable medium comprises further instructions that, in response to being executed on the device, cause the device to perform image processing by generating a depth map based on a first IR texture image corresponding to the raw input image data and a second IR texture image corresponding to the second raw input image data.

In one or more twenty-fifth embodiments, further to the twentieth through twenty-fourth embodiments, applying the color correction transform comprises applying the color correction transform to a plurality of sub-pixel signals of the raw input image data or image data corresponding to the raw input image data to generate a corresponding single pixel of the output image data, wherein the sub-pixel signals comprises at least one red sub-pixel signal value, at least one green sub-pixel signal value, and at least one blue sub-pixel signal value.

In one or more twenty-sixth embodiments, an imaging device comprises means for projecting an IR texture pattern onto a scene, means for generating raw input image data based on an image capture of the scene comprising the projection of the IR texture pattern, wherein the raw input image data comprises an IR texture pattern residual from the IR texture pattern, and means for receiving the raw input image data and applying a color correction transform to the raw input image data or image data corresponding to the raw input image data to generate output image data, wherein the color correction transform is to correct for the IR texture pattern residual such that the output image data has a reduced IR texture pattern residual with respect to the raw input image data.

In one or more twenty-seventh embodiments, further to the twenty-sixth embodiments, the imaging device further comprises means for applying a second color correction transform to the raw input image data or the image data corresponding to the raw input image data to generate IR texture output image data, wherein the second color correction transform is to retain the IR texture pattern residual within the IR texture output image data and the output image data has a reduced IR texture pattern residual with respect to the IR texture output image data.

In one or more twenty-eighth embodiments, at least one machine readable medium may include a plurality of instructions that in response to being executed on a computing device, causes the computing device to perform a method according to any one of the above embodiments.

In one or more twenty-ninth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An imaging device comprising:
  an infrared (IR) projector to project an IR texture pattern onto a scene;
  a color filter array adjacent to an image sensor, the image sensor to generate raw input image data based on an image capture of the scene comprising the projection of the IR texture pattern, wherein the raw input image data comprises an IR texture pattern residual from the IR texture pattern; and
  an image signal processor coupled to the image sensor, the image signal processor to receive the raw input image data, to apply a color correction transform to the raw input image data or image data corresponding to the raw input image data to generate output image data, wherein the color correction transform is to correct for the IR texture pattern residual such that the output image data has a reduced IR texture pattern residual with respect to the raw input image data, and to apply a second color correction transform to the raw input image data or the image data corresponding to the raw input image data to generate IR texture output image data, wherein the second color correction transform is to retain the IR texture pattern residual within the IR texture output image data and the output image data has a reduced IR texture pattern residual with respect to the IR texture output image data, and wherein a plurality of pixel positions within the IR texture output image data comprise the IR texture pattern residual and the output image data having a reduced IR texture pattern residual with respect to the IR texture output image data comprises the IR texture output image data having a first average luminance at the plurality of pixel positions within the IR texture output image data and the output image data having a second average luminance at the same plurality of pixel positions within the output image data that is less than the first average luminance.

2. The imaging device of claim 1, wherein the color correction transform is implemented in a first image processing pipeline of the image signal processor and the second color correction transform is implemented in a second image processing pipeline of the image signal processor.

3. The imaging device of claim 1, further comprising:
  a second image sensor to generate second raw input image data based on a second image capture of the scene having the projection of the IR texture pattern, wherein the second raw input image data comprises a second IR texture pattern residual from the IR texture pattern, and wherein the first and second image sensors are horizontally aligned with respect to the scene.

4. The imaging device of claim 3, further comprising:
  a processor coupled to the image signal processor, the processor to generate a depth map based on the IR texture output image data corresponding to the raw input image data and second IR texture image data corresponding to the second raw input image data.

5. The imaging device of claim 4, wherein the processor to generate the depth map comprises the processor to perform stereoscopic image matching based on the IR texture image and the second IR texture image.

6. The imaging device of claim 3, wherein the image signal processor is further to receive the second raw input image data and to apply the color correction transform to the second raw input image data or image data corresponding to the second raw input image data to generate second output image data.

7. The imaging device of claim 1, wherein the image signal processor to apply the color correction transform comprises the image signal processor to apply the color correction transform to a plurality of sub-pixel signals of the raw input image data or image data corresponding to the raw input image data to generate a corresponding single pixel of the output image data, wherein the sub-pixel signals comprises at least one red sub-pixel signal value, at least one green sub-pixel signal value, and at least one blue sub-pixel signal value.

8. The imaging device of claim 7, wherein the plurality of sub-pixel signals consists of a single red sub-pixel signal value, two green sub-pixel signal values, and a single blue sub-pixel signal value and the single pixel of the output image data comprises a red pixel value, a green pixel value, and a blue pixel value.

9. The imaging device of claim 1, wherein the image sensor comprises a complementary metal-oxide-semiconductor (CMOS) sensor, the color filter array comprises a red-green-blue color filter array, and the image signal processor comprises an application-specific integrated circuit (ASIC).

10. A method for image processing comprising:
receiving, from an image sensor having a color filter array adjacent thereto, raw input image data comprising an infrared (IR) texture pattern residual from an IR texture pattern projected on a scene during an image capture of the scene;
applying a color correction transform to the raw input image data or image data corresponding to the raw input image data to generate output image data, wherein the color correction transform is to correct for the IR texture pattern residual such that the output image data has a reduced IR texture pattern residual with respect to the raw input image data;
applying a second color correction transform to the raw input image data or the image data corresponding to the raw input image data to generate IR texture output image data, wherein the second color correction transform is to retain the IR texture pattern residual within the IR texture output image data and the output image data has a reduced IR texture pattern residual with respect to the IR texture output image data, and wherein a plurality of pixel positions within the IR texture output image data comprise the IR texture pattern residual and the output image data having a reduced IR texture pattern residual with respect to the IR texture output image data comprises the IR texture output image data having a first average luminance at the plurality of pixel positions within the IR texture output image data and the output image data having a second average luminance at the same plurality of pixel positions within the output image data that is less than the first average luminance; and
providing the output image data for display to a user or for use in computer vision processing.

11. The method of claim 10, further comprising:
receiving second raw input image data based on a second image capture of the scene having the projection of the IR texture pattern, wherein the second raw input image data comprises a second IR texture pattern residual from the IR texture pattern, and wherein the raw input image data and the second raw input image data are from first and second image sensors that are horizontally aligned with respect to the scene.

12. The method of claim 11, further comprising:
generating a depth map based on a first IR texture image corresponding to the raw input image data and a second IR texture image corresponding to the second raw input image data.

13. The method of claim 10, wherein applying the color correction transform comprises applying the color correction transform to a plurality of sub-pixel signals of the raw input image data or image data corresponding to the raw input image data to generate a corresponding single pixel of the output image data, wherein the sub-pixel signals comprises at least one red sub-pixel signal value, at least one green sub-pixel signal value, and at least one blue sub-pixel signal value.

14. At least one non-transitory machine readable medium comprising a plurality of instructions that, in response to being executed on a device, cause the device to perform image processing by:
receiving, from an image sensor having a color filter array adjacent thereto, raw input image data comprising an infrared (IR) texture pattern residual from an IR texture pattern projected on a scene during an image capture of the scene;
applying a color correction transform to the raw input image data or image data corresponding to the raw input image data to generate output image data, wherein the color correction transform is to correct for the IR texture pattern residual such that the output image data has a reduced IR texture pattern residual with respect to the raw input image data;
applying a second color correction transform to the raw input image data or the image data corresponding to the raw input image data to generate IR texture output image data, wherein the second color correction transform is to retain the IR texture pattern residual within the IR texture output image data and the output image data has a reduced IR texture pattern residual with respect to the IR texture output image data, and wherein a plurality of pixel positions within the IR texture output image data comprise the IR texture pattern residual and the output image data having a reduced IR texture pattern residual with respect to the IR texture output image data comprises the IR texture output image data having a first average luminance at the plurality of pixel positions within the IR texture output image data and the output image data having a second average luminance at the same plurality of pixel positions within the output image data that is less than the first average luminance; and
providing the output image data for display to a user or for use in computer vision processing.

15. The non-transitory machine readable medium of claim 14, the machine readable medium comprising further instructions that, in response to being executed on the device, cause the device to perform image processing by:
receiving second raw input image data based on a second image capture of the scene having the projection of the IR texture pattern, wherein the second raw input image data comprises a second IR texture pattern residual from the IR texture pattern, and wherein the raw input image data and the second raw input image data are from first and second image sensors that are horizontally aligned with respect to the scene.

16. The non-transitory machine readable medium of claim 15, the machine readable medium comprising further instructions that, in response to being executed on the device, cause the device to perform image processing by:
generating a depth map based on a first IR texture image corresponding to the raw input image data and a second IR texture image corresponding to the second raw input image data.

17. The non-transitory machine readable medium of claim 14, wherein applying the color correction transform comprises applying the color correction transform to a plurality of sub-pixel signals of the raw input image data or image data corresponding to the raw input image data to generate a corresponding single pixel of the output image data, wherein the sub-pixel signals comprises at least one red sub-pixel signal value, at least one green sub-pixel signal value, and at least one blue sub-pixel signal value.

* * * * *